United States Patent
Le Roux et al.

(10) Patent No.: US 9,292,159 B2
(45) Date of Patent: Mar. 22, 2016

(54) METHOD FOR THE TEMPORAL DISPLAY OF THE MISSION OF AN AIRCRAFT

(75) Inventors: Yannick Le Roux, St Medard en Jalles (FR); Alexiane Bailly, Marcheprime (FR)

(73) Assignee: Thales, Neuilly sur Seine (FR)

( * ) Notice: Subject to any disclaimer, the term of this patent is extended or adjusted under 35 U.S.C. 154(b) by 204 days.

(21) Appl. No.: 13/995,150

(22) PCT Filed: Dec. 16, 2011

(86) PCT No.: PCT/EP2011/073022
§ 371 (c)(1),
(2), (4) Date: Jun. 17, 2013

(87) PCT Pub. No.: WO2012/080453
PCT Pub. Date: Jun. 21, 2012

(65) Prior Publication Data
US 2013/0268878 A1    Oct. 10, 2013

(30) Foreign Application Priority Data
Dec. 17, 2010 (FR) .................................... 10 04947

(51) Int. Cl.
*G06F 3/0481* (2013.01)
*G09B 9/08* (2006.01)
*G01C 23/00* (2006.01)

(52) U.S. Cl.
CPC .............. *G06F 3/0481* (2013.01); *G01C 23/00* (2013.01); *G09B 9/08* (2013.01)

(58) Field of Classification Search
CPC ....................................................... G06F 3/0481
USPC ....................................................... 715/772
See application file for complete search history.

(56) References Cited

U.S. PATENT DOCUMENTS

| | | | | |
|---|---|---|---|---|
| 3,696,671 A * | 10/1972 | Steigleder | ................. | G01S 1/02 353/11 |
| 4,380,050 A * | 4/1983 | Tanner | ..................... | G01S 7/003 342/455 |
| 5,715,163 A * | 2/1998 | Bang | ....................... | G01C 23/00 701/14 |
| 6,542,796 B1 * | 4/2003 | Gibbs | ................... | G01C 23/005 244/183 |
| 7,711,484 B2 * | 5/2010 | Hammarlund | ........ | G01S 5/0072 342/29 |
| 8,089,375 B1 * | 1/2012 | Seah | ..................... | G08G 5/0021 340/971 |
| 8,386,100 B1 * | 2/2013 | Lie | ........................ | G08G 5/0026 244/75.1 |
| 8,396,614 B1 * | 3/2013 | Pschierer | ............... | G01C 23/00 701/14 |
| 2002/0149599 A1 * | 10/2002 | Dwyer | ................... | G01C 23/00 345/592 |
| 2008/0183346 A1 * | 7/2008 | Brown | ................. | G01C 21/005 701/21 |

(Continued)

OTHER PUBLICATIONS

PCT International Search Report for PCT Counterpart Application No. PCT/EP2011/073022, 5 pp. (including English translation), (Mar. 6, 2012).

(Continued)

*Primary Examiner* — Reza Nabi
(74) *Attorney, Agent, or Firm* — Blakely, Sokoloff, Taylor & Zafman LLP

(57) ABSTRACT

The general field of the invention is that of methods for displaying the steps of a mission or of a flight plan of an aircraft on a screen of a display device. The different steps of the method are displayed in a first graphical window comprising a time scale or "timeline", the different steps being displayed opposite the schedule corresponding to their accomplishment. This window can be associated with a cartographic view of the flight plan. It can comprise a "magnifier" function.

7 Claims, 5 Drawing Sheets

(56) References Cited

U.S. PATENT DOCUMENTS

| | | | |
|---|---|---|---|
| 2008/0195309 A1* | 8/2008 | Prinzel III | G01C 23/00 701/532 |
| 2008/0270784 A1* | 10/2008 | Bonnet | G06F 8/10 713/100 |
| 2009/0150073 A1* | 6/2009 | Caraballo | G01C 21/3682 701/414 |
| 2009/0292408 A1* | 11/2009 | Shafaat | G08G 5/0004 701/4 |
| 2010/0114406 A1* | 5/2010 | DeJonge | G01C 23/00 701/3 |
| 2010/0182165 A1* | 7/2010 | Barry | G01C 23/00 340/971 |
| 2010/0228418 A1* | 9/2010 | Whitlow | G11B 27/105 701/25 |
| 2010/0250026 A1* | 9/2010 | Deker | G01C 23/00 701/3 |
| 2011/0087428 A1* | 4/2011 | Barnetche | G01C 21/00 701/532 |
| 2012/0210227 A1* | 8/2012 | Lin | G11B 27/034 715/723 |
| 2012/0215435 A1* | 8/2012 | Subbu | G08G 5/0013 701/120 |
| 2012/0232785 A1* | 9/2012 | Wiesemann | G01C 23/00 701/423 |
| 2013/0144522 A1* | 6/2013 | Irie | G01C 21/3667 701/430 |
| 2013/0231804 A1* | 9/2013 | Servantie | B64D 45/00 701/14 |
| 2013/0234868 A1* | 9/2013 | Koth | G08G 1/123 340/994 |
| 2013/0325244 A1* | 12/2013 | Wang | G05D 1/028 701/26 |
| 2014/0074323 A1* | 3/2014 | Andre | G06F 3/04815 701/3 |
| 2014/0156115 A1* | 6/2014 | Aymeric | G06F 3/0488 701/3 |
| 2014/0279397 A1* | 9/2014 | Schmidt | G06Q 40/025 705/38 |
| 2014/0330453 A1* | 11/2014 | Nakagawa | B60H 1/00428 701/2 |

OTHER PUBLICATIONS

PCT Written Opinion of the International Searching Authority for PCT Counterpart Application No. PCT/EP2011/073022, 8 pp. (including English translation), (Mar. 6, 2012).

PCT Notification Concerning Transmittal of International Preliminary Report on Patentability (Chapter I of the Patent Cooperation Treaty) for PCT Counterpart Application No. PCT/EP2011/073022, 11 pp. (including English translation), (Jun. 27, 2013).

* cited by examiner

METHOD FOR THE TEMPORAL DISPLAY OF THE MISSION OF AN AIRCRAFT

The field of the invention is that of cockpit display systems and in particular of systems dedicated to navigation and to the accomplishment of a flight or of a mission.

The cockpits of modern aircraft are provided with display systems comprising several screens having large dimensions and complex window systems making it possible to show several display areas simultaneously on the same screen.

Generally, for the accomplishment of the mission, the display systems comprise, among others, two types of windows which are, on the one hand, a window called "Navigation Display" or "ND", providing a graphical and geographic view of the situation of the aircraft and, on the other hand, a window displaying, in the form of a table, the list of waypoints or "WL" of the flight plan of the aircraft.

Depending on the type of aircraft, these windows can be located on different display screens or on the same graphical screen.

Thus, in airliners of the A320 or A380 type manufactured by the Airbus Company, as seen in FIGS. 1 and 2, the ND and WL windows are on different screens. FIG. 1 shows a general view of the instrument panel and FIG. 2 shows a partial view of that same instrument panel. Each member of the crew thus has his own set of screens disposed in front of him and has the responsibility of operating his screen using a dedicated man-machine interface or "IHM" with an independent data "feed" to each screen.

On aircraft of the "business jets" type, such as the Falcon manufactured by the Dassault company, the windows can be displayed on a single DS screen, for example situated in the central part of the cockpit and potentially common to both pilots, knowing that each of them has a navigation instrument known as "HSI" on the outer screens situated in front of them for short term information. Such a cockpit is shown in FIG. 3.

FIG. 4 shows an enlarged view of the central DS screen of FIG. 3. It comprises three windows called Navigation Display or ND, the window showing the "waypoints" or WL of the flight plan of the aircraft and a third window called "Vertical Display" or VD, displaying the vertical profile of the terrain under the flight plan of the aircraft or under the estimated flight path of the aircraft.

The "Navigation Display" provides a geographic view of the situation of the aircraft, with the display of a cartographic background whose exact nature, appearance and content can vary sometimes with:
the flight plan of the aircraft;
the characteristic points of the mission like the so-called equal-time points, the end of climb indication, the start of descent indication, etc.:
the surrounding traffic;
the meteorological information in its various aspects such as winds, storms, zones with freezing conditions, etc.

The list of "waypoints" makes it possible to show in tabular form the characteristic points of the flight plan, as well as a certain amount of information regarding the flight plan of the aircraft such as:
the speed or altitude constraints that the aircraft must comply with on passing through the waypoints;
the distance between the waypoints;
the heading to follow on the segment between the waypoints;
the time needed to fly each of the segments;

This list of waypoints $W_I$ is always displayed from bottom to top, that is to say the first waypoints encountered are at the top, the following ones being below. FIG. 5 shows such a list by way of example. This list shows, as indicated in the enlargement at the bottom of FIG. 5, the name of each waypoint (D195H), the time of passing though that waypoint (12:33), the speed of the aircraft (205 knots) and the altitude at the waypoint (FL100 corresponding to an altitude of 10,000 feet).

The vertical display VD makes it possible to show, in a vertical cross section:
the vertical aspects of the flight plan such as the altitudes, the altitude changes, the climb and descent rates, etc.;
the altitude of the terrain under the flight path or under the flight plan of the aircraft. It makes it possible to represent very intuitively the key times of the flight, such as the end of climb or the start of the descent of the aircraft.

These different displays thus allow the operators to be aware of all of the aspects relating to the management of the navigation of the aircraft, whether tactical or strategic.
Tactical: in order to have a complete and precise view of the close context of the aircraft, the distance and the time to the next waypoint, the vertical deviation from the descent plan, the surrounding relief at the time of the takeoff or of the approach, the winds and meteorological disturbances, the navigation means, etc.,
Strategic: in order to apprehend and anticipate future situations, the strategic choices in terms of flight plan, meteorology, fuel consumption, flight levels, etc.

However, the major disadvantage of these representations, including on the most successful systems, is their lack of integration and inter-correlation not making it possible to relate them easily to each other logically. Only the scale of representation between the Vertical Display and Navigation Display windows have common and consistent management, the modification of the scale of the ND having automatic repercussion on the vertical display VD. The different windows display complementary information of which the operators must check the consistency and appropriateness with respect to the capabilities of the aircraft according to the environmental and contextual conditions encountered.

It is clear that the common point between all of the items of information displayed in the windows of systems of the prior art is time. This point is also shared with the crew and the mission. The time axis is a representation that is totally absent from cockpits at the present time, apart from the passing-through time indicated opposite each of the characteristic points of the flight plan in the tabular representation of the waypoints. In these existing representations, time is only an item of information which has no further value or other function than the other items of information provided.

However, the temporal aspect is fundamental and cannot be disassociated from the management of the operators' mission. However, it appears very little in these displays. The vision of information in temporal space today demands mental calculations by the operators, as a function of distances and of the current or future speed of the aircraft.

The method according to the invention is based on a time scale. It makes it possible to obtain a consistent and integrated representation of the mission of the aircraft. In other words, it provides technical crews with concise and efficient views of their mission, allowing them, among other things, to understand, anticipate and make decisions with full knowledge of the state of the aircraft and of its environment. The crew's perception of the situation of the aircraft during its mission is thus improved.

More precisely, the invention relates to a method for displaying the steps of a mission of an aircraft on a screen of a display device, characterized in that the different steps are displayed in a first graphical window comprising a time scale, or "timeline", the different steps being displayed opposite the schedule corresponding to their accomplishment.

Advantageously, as the length of the "timeline" is longer than the length of the first graphical window, the graphical window therefore displays only a part of the "timeline", this part being imposed by the user of the display device.

Advantageously, the first window comprises a first symbol representing the aircraft, said first symbol being situated, in a standard operating method, at the current time on the on time scale.

Advantageously, when the current time is situated outside of the graphical window, the first symbol is displayed at the top or at the bottom of the window, a predetermined action by the user on said symbol automatically centering the "timeline" on the current time.

Advantageously, the first graphical window comprises a "magnifier" function making it possible to expand the time scale by a predetermined factor within a predetermined time range centered on a time imposed by the user of the display device.

Advantageously, with the mission being a flight plan and each step corresponding to a waypoint of the flight plan, the display comprises a second graphical window representing a cartographic view of said flight plan, said second window also comprising a second symbol representing the aircraft, said second symbol being situated, in a standard operating mode, on the cartographic view at the current time.

Advantageously, the first window and the second window are disposed on the same display screen, juxtaposed with each other.

Advantageously, movement of the magnifier results in movement of the second symbol on the cartographic view in such a way that the position of that second symbol is representative of the position that the aircraft would actually occupy at the time indicated by the magnifier.

The invention will be better understood and other advantages will become apparent on reading the following description given in a non-limitative way and with reference to the appended figures among which:

The representation of a flight plan according to the invention is a time-oriented display and representation method. The change from a "list" representation of the flight plan as known at the present time to a representation on a time axis is made possible thanks to the ability to predict times of passing through the different characteristic points, with a precise knowledge of the capabilities of the aircraft and of environmental conditions such as the meteorological and wind conditions.

This time axis serves as a medium for the representation of multiple items of information. This representation according to a time axis is advantageously used by representing the past at the bottom of the display and the future towards the top of the display, in order to produce a consistency of reading with the "Navigation Display" geographic display which the aircraft has upwardly oriented, that is to say with its future environment towards the top. This homogeneity provides common and simplified reading of complementary information about the mission.

Figure 1:
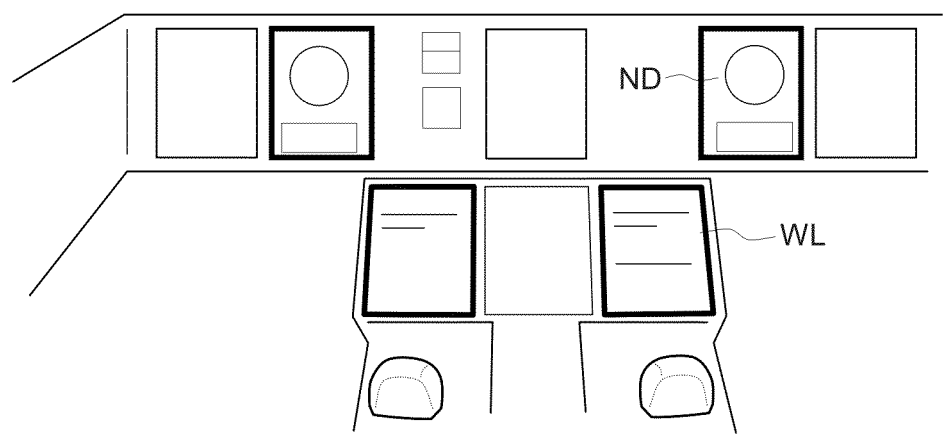
FIGS. 1, 2 and 3 show navigation screens in different cockpit configurations.
Figure 2:
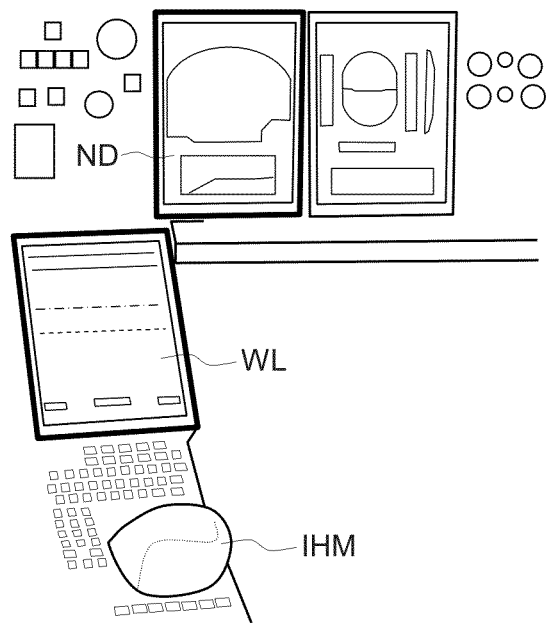
Figure 3:
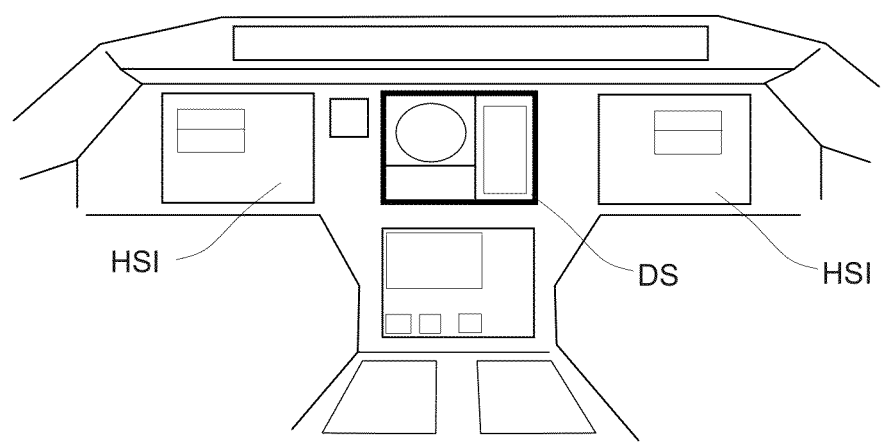
Figure 4:
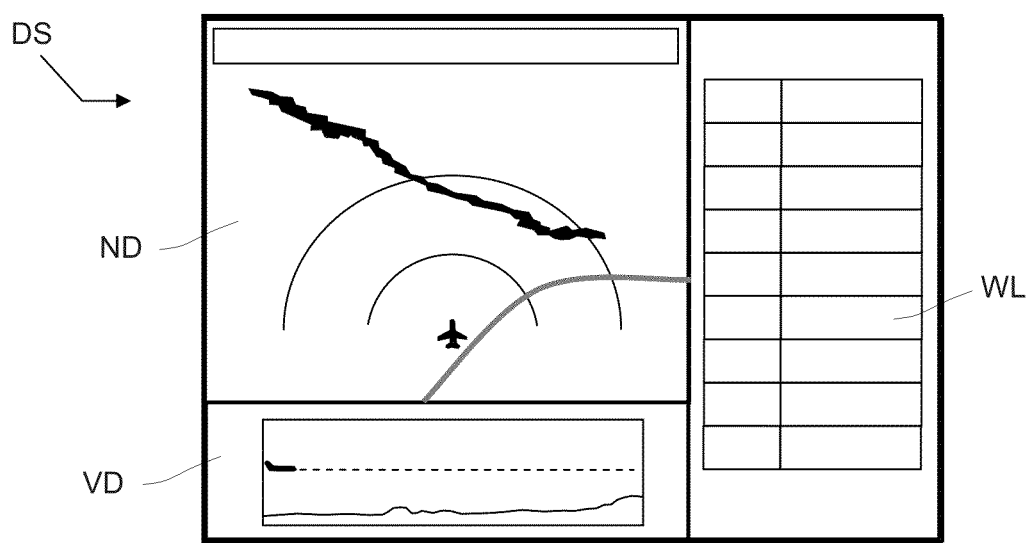
FIG. 4 shows a display screen with three windows presenting navigation information and the waypoints of a flight plan.
Figure 5:
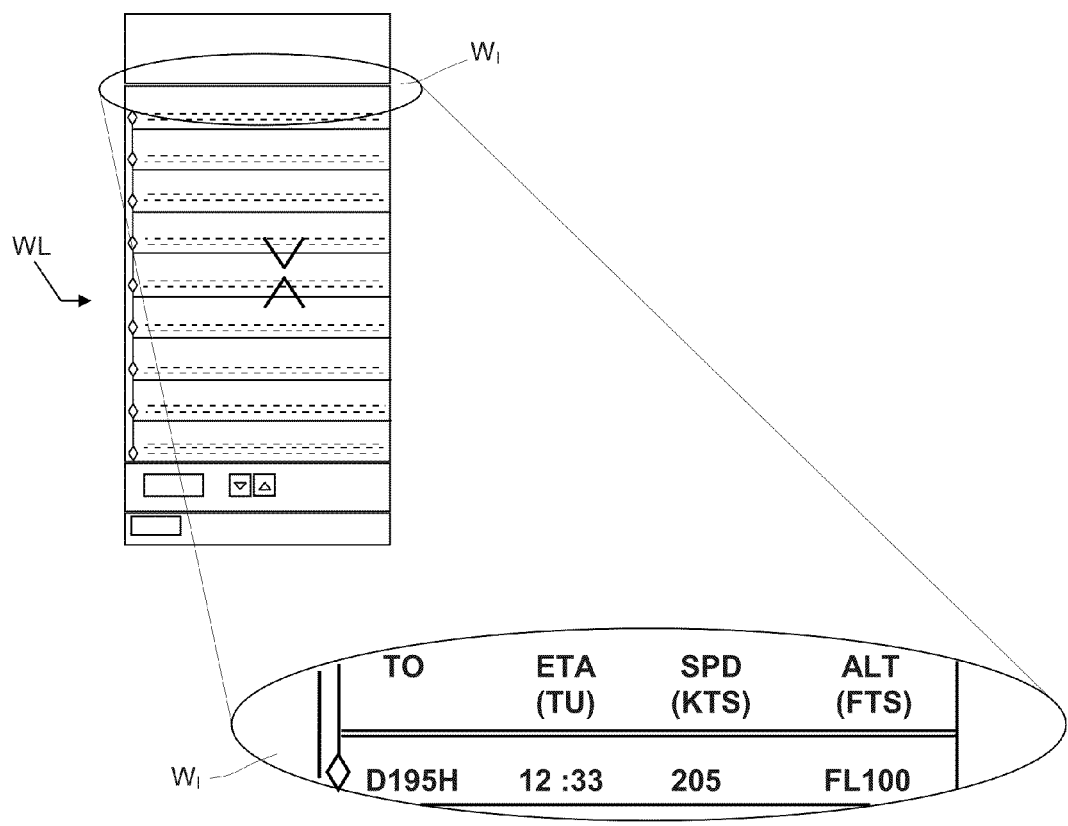
FIG. 5 shows enlarged partial views of the list of waypoints shown in FIG. 4.
Figure 6:
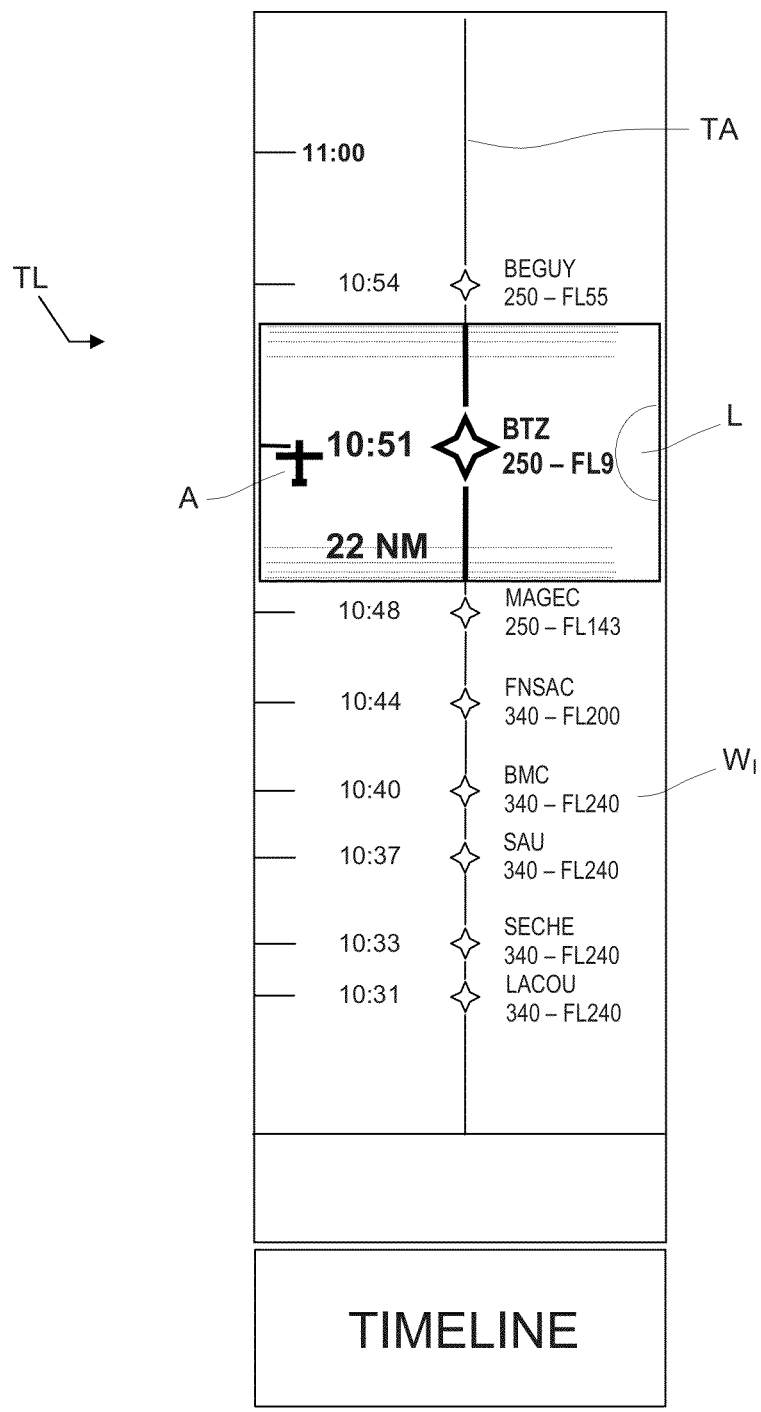
FIG. 6 shows a graphical window with a time scale or "timeline" according to the invention and showing the different steps of a flight plan.

By way of example, FIG. 6 shows a graphical window with a time scale or "timeline" TL according to the invention and shows the different steps of a flight plan. It is oriented with the "past" towards the bottom and the "future" towards the top as previously stated. The time axis TA divides this window into two sections. The time indications according to a time scale are shown on the left. In the present case, the time is shown between 10:30 and 11:00. The waypoints $W_I$ are shown on the right. The following data can appear there, this list not being exhaustive:

Display of the current position of the aircraft at the present time. In FIG. 6, a symbol A representing the aircraft is displayed in front of the present time of "10:51". This display improves the perception of the real situation of the aircraft such as, for example, the temporal proximity of obstacles, of bad meteorological conditions, etc., Display of noteworthy points of the flight plan, navigation beacons, end of climb, start of descent, point of no return (in equal time or equal fuel consumption). The indications "LACOU", "SECHE", "SAU", etc. thus appear in FIG. 6;

Display of precise data of the flight plan such as the constraints relating to speed, altitude, aircraft attitude, remaining fuel. FIG. 6 thus shows the speeds like "340" or "250" and the flight levels like "FL240", corresponding to an altitude of 24,000 feet;

Display of the points of rendezvous with ground control:
  Access to the radio communication frequencies of the control zones passed through;

Display of the points of rendezvous with the aircraft:
  Access to the "check lists" which have to be followed at defined times and therefore intuitively placed on the time axis;
  Ability to take time-logged notes, reminders making it possible to place notes at a given time on the time axis.

Figure 7:
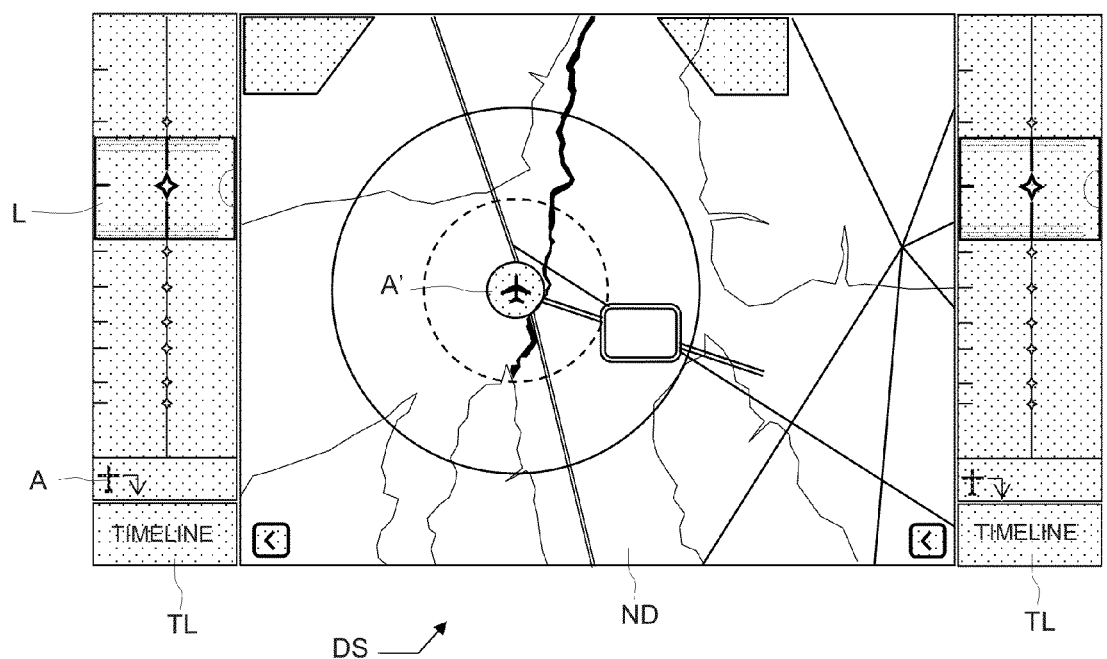
FIG. 7 shows a set of three windows showing the "timeline" and cartographic view association.

Conventionally, the display comprises a second graphical window showing a cartographic view, called "Navigation Display", of the flight plan also comprising a second symbol A' representative of the aircraft, this second symbol being situated, in a standard operating mode, on the cartographic view at the current time. It is very advantageous to couple the "timeline" with this cartographic representation as seen in FIG. 7 where two "timelines" TL according to the invention frame a cartographic representation ND, all of them arranged on a common monitoring screen DS. Thus, if this screen is disposed at the center of the instrument panel, the pilot and the copilot can interact with the "timeline". The advanced capability of progressing the flight plan along the time axis is integrated with a link to the graphical display, simplifying the checking of consistency of information. This link between the temporal progress and the graphical progress, which can be a lateral view in the Navigation Display or a vertical view on the Vertical Display, provides a genuine tool for checking the flight plan in all of its aspects.

It is possible to integrate advanced assistance tools on the "timeline" medium, and in particular a magnifier L in the time axis, as can be seen in FIGS. 6 and 7. This magnifier makes it possible to expand the time around a particular moment. The movement of this magnifier along the time axis can result in moving a "virtual" aircraft A on the graphical flight plan. The position of the aircraft at the time corresponding to the position of the magnifier that is being operated can thus be seen graphically.

In the same way that it is possible to move the zone visible on the "Navigation Display", it is possible:

- to navigate in the timeline, that is to say to move the visible time slot and to adapt it to the sought information;
- to zoom and to unzoom, for example by means of a "pinch" or two-fingered pinching action when the screen is a touch screen. The zoom can have as an effect, for example, the automatic selection of the quantity and type of information items displayed;
- to retain a representation of a "phantom" aircraft. The timeline does not necessarily display the whole of the flight plan. In the case where the visible time slot does not make it possible to see the current time, the display of the aircraft A is situated either above or below, depending on the position of the current time on the axis and has the appearance of a "phantom". For example, the symbol of the aircraft is shown in white, dotted, or semi-transparently. In FIG. 7, the "phantom" aircraft are at the bottom of the "timelines". An interaction on this "phantom" aircraft icon makes it possible to re-center the temporal view on the current time and the current position of the aircraft.

The graphical representations shown in FIGS. 6 and 7 are given by way of example and take into account the technical constraints of the patent figures. It is of course usefully possible to use representations in color, with shading, using effects such as flashing, color or brightness changes to emphasize such and such an effect. It is also possible to modify the disposition and location of the timeline. All of these graphical variants remain within the context of the method according to the invention.

This representation according to the invention thus provides a medium for logical linking between a large number of items of information that are at present displayed independently in the cockpit. Operators are provided with significant references, close to those which they already have, like the departure time slot or the estimated time of arrival, that they will be able to look through in order to acquire the information relevant to the mission.

Moreover, this display of the mission of the aircraft on a time axis makes it easy to see the moments of calm between the characteristic points of the flight plan as well as the periods of intense work load, which has the advantage of allowing operators to know the times at which they can and must anticipate the tasks and to prepare themselves for the future increase in work load.

The invention claimed is:

1. A method for displaying stages of a mission of an aircraft on a screen of a display device, the method comprising:
   displaying a first graphical window comprising a time scale, the stages being displayed in the time scale, the stages being displayed opposite a schedule of time indications in the time scale, the schedule of time indications corresponding to accomplishment of the stages,
   wherein a length of the time scale is longer than a length of the first graphical window such that the first graphical window displays only a part of the time scale, the displayed part of the time scale being imposed by a user of the display device,
   wherein the first graphical window comprises a first symbol representing the aircraft, the first symbol being situated, in a standard operating mode, at a current time on the time scale,
   wherein, when a current time is situated outside of the first graphical window, the first symbol representing the aircraft is displayed at a top of the displayed part of the time scale or at a bottom of the displayed part of the time scale, a predetermined action by the user on the first symbol automatically centering the time scale on the current time.

2. The method of claim 1, wherein the first graphical window comprises a magnifier function for expanding the time scale by a predetermined factor within a predetermined time range centered on a time imposed by a user of the display device.

3. The method of claim 2, wherein, with the mission being a flight plan and each stage corresponding to a waypoint of the flight plan, the method further comprises displaying a second graphical window, the second graphical window representing a cartographic view of said the flight plan, the second graphical window comprising a second symbol representing the aircraft, the second symbol being situated, in a standard operating mode, on the cartographic view at a current time.

4. The method of claim 3, wherein the first graphical window and the second graphical window are disposed on the same display screen, juxtaposed with each other, or on different screens.

5. The method of claim 3, wherein movement of the magnifier function results in movement of the second symbol on the cartographic view in such a way that a position of that second symbol is representative of a position that the aircraft would actually occupy at a time indicated by the magnifier function.

6. The method of claim 1, wherein, with the mission being a flight plan and each stage corresponding to a waypoint of the flight plan, the method further comprises displaying a second graphical window representing a cartographic view of the flight plan, the second graphical window comprising a second symbol representing the aircraft, the second symbol being situated, in a standard operating mode, on the cartographic view at the current time.

7. The method of claim 1, wherein the first graphical window comprises a magnifier function for expanding the time scale by a predetermined factor within a predetermined time range centered on a time imposed by the user of the display device.

* * * * *